United States Patent [19]
Takagi et al.

[11] Patent Number: 5,517,484
[45] Date of Patent: May 14, 1996

[54] OPTICAL DISK AND OPTICAL DISK RECORDING AND REPRODUCING APPARATUS

[75] Inventors: Yuji Takagi, Hirakata; Isao Satoh, Neyagawa; Motoshi Ito, Moriguchi; Yuji Hisakado, Neyagawa, all of Japan

[73] Assignee: Matsushita Electric Industrial Co., Ltd., Kadoma, Japan

[21] Appl. No.: 193,502

[22] Filed: Feb. 8, 1994

[30] Foreign Application Priority Data

Feb. 9, 1993 [JP] Japan .................................. 5-021340

[51] Int. Cl.⁶ .................................................. G11B 20/18
[52] U.S. Cl. ........................... 369/275.3; 369/53; 369/54; 369/56; 371/37.4; 371/37.7; 371/49.1
[58] Field of Search ................................ 369/275.3, 53, 369/54, 56, 57, 47, 44.32, 44.33; 371/37.4, 37.7, 49.1

[56] References Cited

U.S. PATENT DOCUMENTS

| | | | |
|---|---|---|---|
| 4,653,051 | 3/1987 | Sugimura et al. | 371/37.4 |
| 4,719,628 | 1/1988 | Ozaki et al. | 371/37.4 |
| 4,760,576 | 7/1988 | Sako | 371/37.4 |
| 4,819,236 | 4/1989 | Sako et al. | 371/37.4 |
| 4,949,326 | 8/1990 | Takagi et al. | 369/54 |
| 5,068,855 | 11/1991 | Kashida et al. | 371/37.4 |
| 5,099,464 | 3/1992 | Maeda | 369/47 |
| 5,170,400 | 12/1992 | Dotson | 371/37.4 |
| 5,200,943 | 4/1993 | Sano et al. | 369/48 |
| 5,224,087 | 6/1993 | Maeda et al. | 369/47 |

*Primary Examiner*—Tan T. Nguyen
*Attorney, Agent, or Firm*—Beveridge, DeGrandi, Weilacher & Young

[57] ABSTRACT

A reproduction type optical disk having same sector structure as that of a recordable optical disk, can reproduce data even if a plurality of sectors are disabled from correction. The disk has data sectors for recording data, parity sectors obtained by a new error correction coding between a plurality of data sectors, wherein the error correction coding between the data sectors is performed by arranging a plurality of data sectors into a matrix and by coding them in directions of row and column doubly to make a product code.

25 Claims, 7 Drawing Sheets

D2, D3, D35, D36 : CORRECTION DISABLE SECTORS

FIG. 7

D1~D225: DATA SECTORS
P1~P15 ) PARITY SECTORS
Q1~Q16
D2, D3, D35, D36 : CORRECTION DISABLE SECTORS

FIG. 8

OPTICAL DISK AND OPTICAL DISK RECORDING AND REPRODUCING APPARATUS

BACKGROUND OF THE INVENTION

1. Field of the Invention

The present invention relates to an optical disk having a sector structure and an apparatus for recording and reproducing the same. More particularly, it relates to an optical disk on which data are recorded in a plurality of sectors with error detection and correction coding performed between the sectors and to an optical disk reproducing apparatus for reproducing the data from such an optical disk.

2. Description of the Related Art

For an optical disk on which data are divided into sectors ranging from 512 bytes to 2 kilo-bytes to be recorded, coding for detecting and correcting errors is performed on a sector basis when the data are recorded so that the data in each sector will be properly reproduced. However, since the error detection and correction codes are provided on the basis of sectors ranging from 512 bytes to 2 kilo-bytes, it is difficult to accommodate a sufficient interleave length. As a result, in the case of a long error affecting the entire sectors, correction of such an error has been impossible and proper data reproduction has been difficult in some cases. In the case of a write once type or rewritable type optical disk, it has become common to perform the so-called read-verify operation wherein data are reproduced immediately after recording in order to verify that the data are properly reproduced and, if they are not properly reproduced, to perform a substitution process wherein the data are rerecorded in substitute sectors.

For a read only type optical disk used for reproduction such as a computer program and a dictionary for a word processor wherein code data are recorded in advance, unlike the recordable optical disks such as the write once type and rewritable type, the read-verify process and the substitution process as described above can not be performed. Therefore, the ability of correcting errors itself must be improved to prevent correction from being disabled.

As methods for improving the error correcting capability, there are a method wherein the error correction code for each sector is enhanced and a method wherein recording is performed on sectors having the same structure as that of the recordable type sectors by adding parity sectors wherein error detection and correction coding has been performed between the plurality of sectors. When compatibility between the recordable type and reproduction-only type is considered, the method using parity sectors is preferable because the structure of sectors can be the same according to this method. As disclosed in U.S. Pat. No. 4,949,326 and U.S. Pat. No. 5,077,720, in an optical disk or an optical disk reproducing apparatus employing the parity sectors, for example, the overall parity for the data sector of one track is prerecorded as one parity sector.

For optical disks of the recordable type, error correction is performed with only the error correction code for each sector. In most optical disks of the reproduction only type, error correction is also performed using the error correction code for each sector and, only when error correction of the sectors is disabled, error correction is performed using the parity sectors which have been configured as error correction codes between the sectors.

The use of error correction codes having high error-correcting capability such as Reed-Solomon codes having a large minimum distance for such inter-sector coding which is not normally used and is added only for security purposes results in a significant increase in hardware and consequently in the manufacturing cost. It has been common to employ a simple structure wherein the error correction code for each sector used for both the recordable type and reproduction type is relatively strong and one overall parity sector is provided for each track as a parity sector.

Optical disks are characterized by their ability of high-density recording and data are recorded thereon by forming recording pits which are not deeper than 1 um on tracks provided at pitches of about 1.5 um. Further improvement of recording density is currently pursued by, for example, making the wavelengths of the semiconductor lasers shorter. As recording density is improved, scratches, dust and the like on the media become more harmful to the reliability of optical disks. Specifically, as recording density is improved, one scratch of dust may disable a plurality of sectors from being corrected simultaneously. This has resulted in a problem that reliability in data reproduction has become insufficient for conventional reproduction type optical disks utilizing simple overall parity as parity sectors. Such sectors which can not be corrected constitute a burst error for sectors which are consecutive in the direction of the tracks or the radial direction of the disk, and a sufficient error correcting capability can not be obtained even for error correction codes having a high error correcting capability such as a Read-Solomon code which is capable of correcting errors in a plurality of sectors for inter-sector coding.

SUMMARY OF THE INVENTION

Taking the above-mentioned problems into consideration, it is an object of the present invention to provide an optical disk and an optical disk reproducing apparatus wherein data can be reproduced with sufficient reliability even if error correction is disabled in a plurality of sectors simultaneously or such sectors which can not be corrected are generated consecutively in the direction of the tracks or in the radial direction of the disk.

In order to solve the above-mentioned problems, the present invention provides an optical disk comprising:

data sectors for recording data, parity sectors obtained by a new error correction coding between a plurality of the data sectors, wherein the error correction coding between the data sectors is performed by arranging a plurality of data sectors into a matrix and by coding them in directions of row and column to make a product code, and the sector has the same structure as those of a recordable and reproducible optical disk for recording and reproducing data on a sector basis.

In the optical disk of the above present invention the data sectors and the parity sectors which have been configured as the product code are recorded on the optical disk in an order of the direction of rows of the matrix in a manner that the data sectors and the parity sectors on the same column of the matrix are not aligned in a radial direction of the optical disk.

In the optical disk of the above present invention, when the number of sectors in a direction of the rows of the matrix is indicated by m, and the number of sectors in a direction of the columns of the matrix is indicated by n, and the number of the sectors recorded on one track of the optical disk is indicated by k, the m and the n are smaller than the k.

In the optical disk of the above present invention, when the number of sectors in a direction of the rows of the matrix is indicated by m, and the number of the sectors recorded on one track of the optical disk is indicated by k, the m and the k are prime numbers for each other.

An optical disk reproducing apparatus of the present invention for reproducing data from the optical disk according to any of the above optical disks comprises a first error correcting means for performing error correction on a sector basis and a second error correcting means for performing error correction on a basis of block which is configured as a product code between a plurality of sectors, and the second error correcting means performing error correction only for a row or column to which sectors of which error correction performed by the first error correcting means has become impossible belong.

Further the optical disk reproducing apparatus of the above present invention has a RAM capable of storing all the data in one block wherein all the sectors in one block are reproduced in advance and are stored in the RAM regardless of whether sectors which can not be corrected are generated or not.

With the above-described configuration, even if a plurality of sectors are disabled from error correction and, further, such sectors which can not be corrected are generated consecutively in the direction of the tracks or in the radial direction of the disk, the sectors which have not been correctable can be properly reproduced by decoding the product code with the second error correcting means. Thus, a highly reliable optical disk to be exclusively used for reproduction can be provided with interchangeability with a recordable optical disk maintained, which is highly advantageous in practical use.

DESCRIPTION OF THE PREFERRED EMBODIMENT

Figure 1:
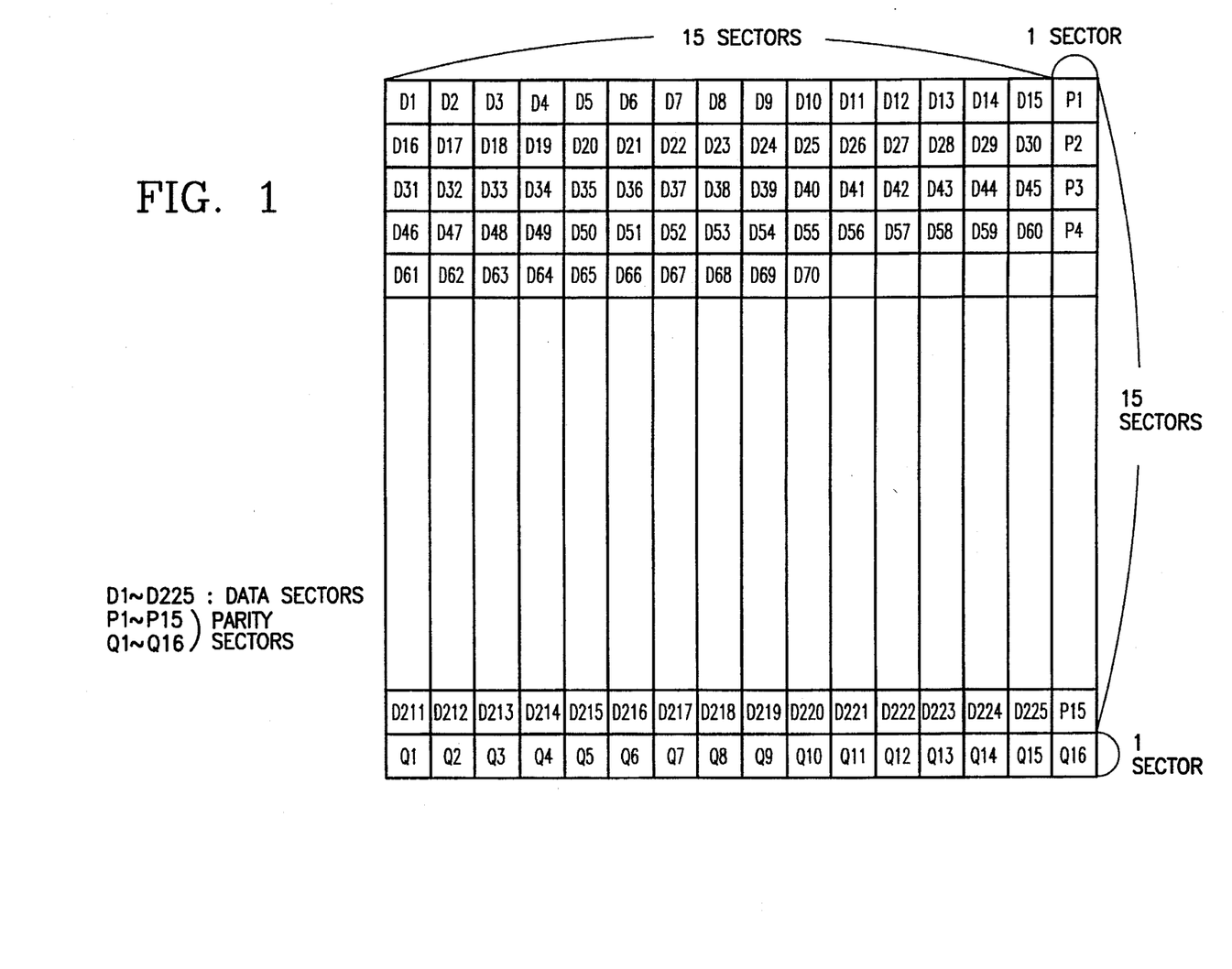
FIG. 1 shows the configuration of codes between sectors of an optical disk of a first embodiment of the present invention.

FIG. 1 shows the configuration of codes between sectors of an optical disk of a first embodiment of the present invention. In FIG. 1, D1 through D225 designate data sectors where user data are stored; P1 through P15 designate parity sectors wherein overall parity is stored for each row of the data sectors D1 through D225 arranged in the form of a matrix of 15×15; and Q1 through Q16 designate parity sectors wherein overall parity is stored for each column of the data sectors D1 through D255 arranged in the form of a matrix and the parity sectors P1 through P15. Thus, a plurality of data sectors are arranged in the form of a matrix and product coding is performed wherein they are double-coded in the directions of the columns and the rows.

Figure 2:
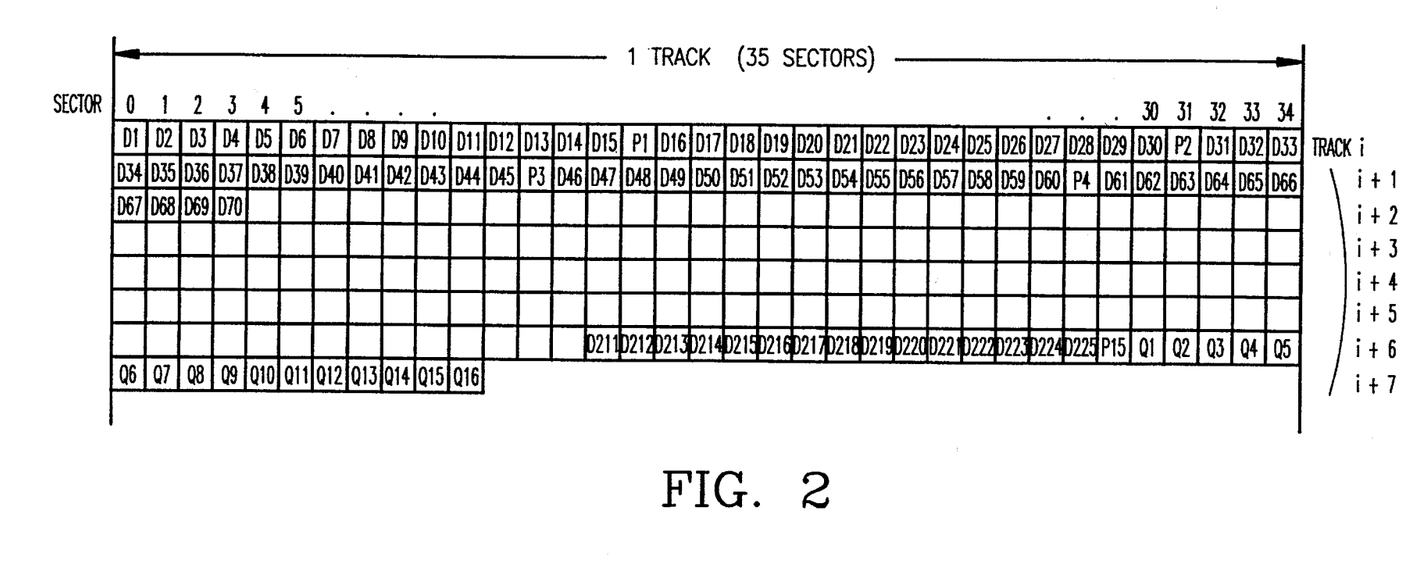
FIG. 2 shows an area of the optical disk of the first embodiment to illustrate the actual arrangement of the sectors thereon.

FIG. 2 shows an area of an optical disk to illustrate the actual state of recording of the sectors product coded as shown in FIG. 1.

Figure 8:
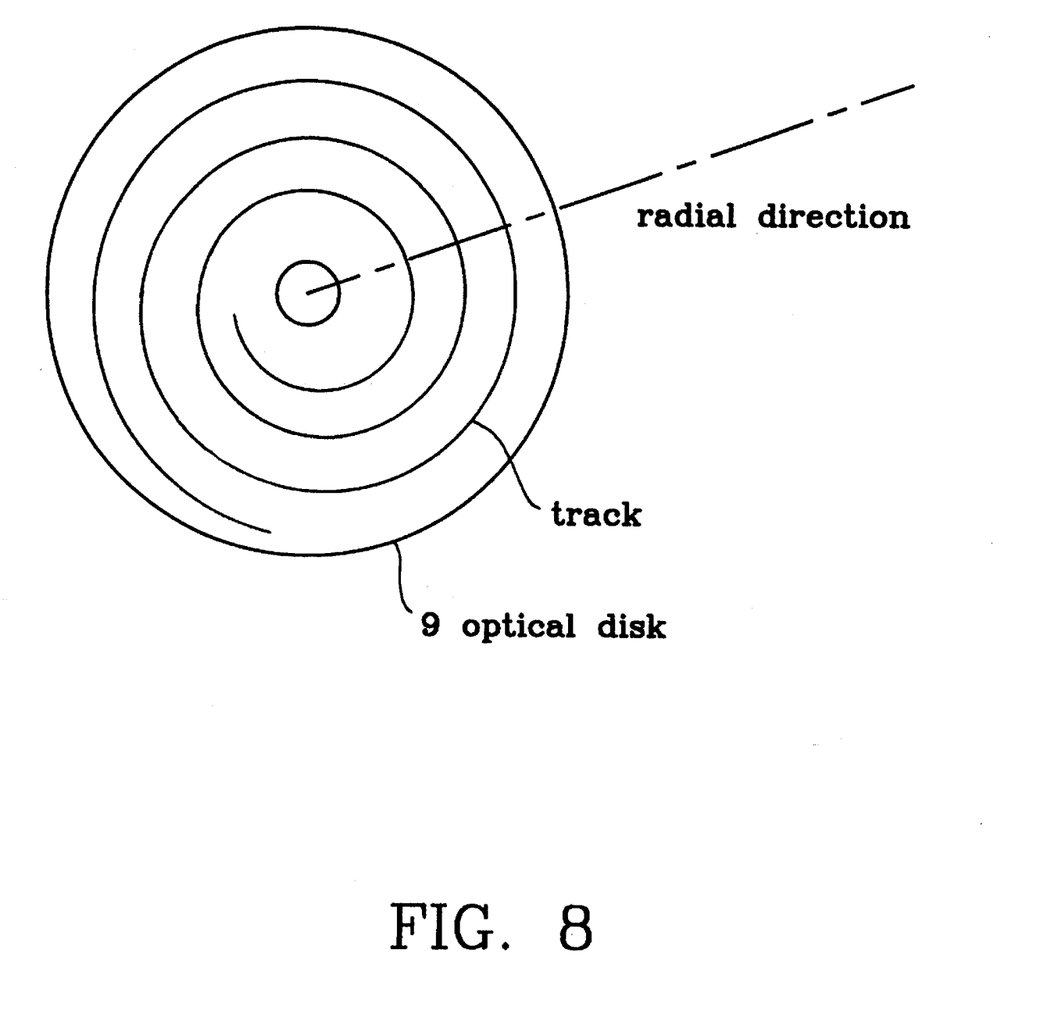
FIG. 8 shows a plane drawing of the an optical disk according to the invention.

In FIG. 2, one track is constituted by 35 sectors. The data sectors D1, D2, D3, etc. are recorded in sector 0, sector 1, sector 2, etc., respectively of a track i and the parity sector Q16 is recorded in sector 10 of a track i+7. In other words, each sector arranged in the form of a matrix of 16×16 is treated as a block and the sectors are prerecorded on the optical disk in the order in the direction of the rows. Such areas to be exclusively used for reproduction are recorded on a block basis on the entire surface or in certain regions of the disk. FIG. 8 shows the plane view of an general optical disk.

The number of sectors on one track, i.e., 35 and the number of sectors in the direction of the rows of the multiplied codes in FIG. 1, i.e., 16 are prime numbers for each other and sectors adjoining each other in the radial direction of the optical disk, e.g., D3, D36, D69, etc. and Q8 of the sector 2 are not aligned on the same column in the configuration of the multiplied codes on the matrix in FIG. 1.

Figure 3:
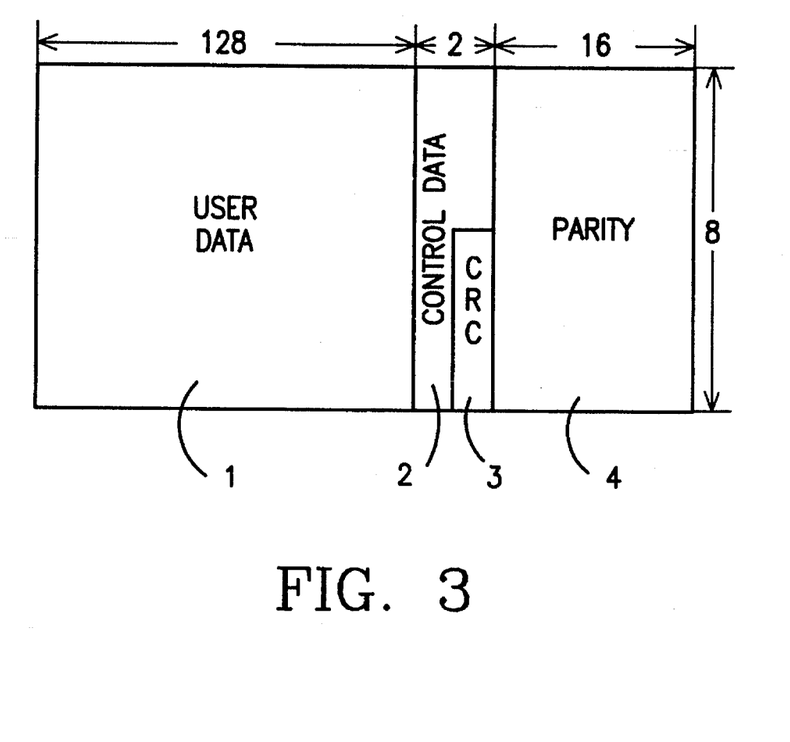
FIG. 3 is a block diagram showing the configuration of data sectors of the optical disk of the first embodiment.

FIG. 3 is a block diagram showing the configuration of a data sector.

In FIG. 3, the data sector consists of 8 bytes× 146 bytes=1168 bytes. 1 designates user data consisting of 1024 bytes. 2 designates control data consisting of the sector address for recording on the disk and the like. 3 designates a cyclic redundancy check code for detecting errors in the user data 1 and the control data 2. 4 designates parity which is configured as an error correction code for correcting errors in the user data 1, the control data and the CRC 3. As the error detection and correction code, the Reed-Solomon code capable of correcting multiple errors or the like is used. In this case, parity of 16 bytes is added to each row to allow errors in up to 8 bytes to be corrected per row.

Figure 4:
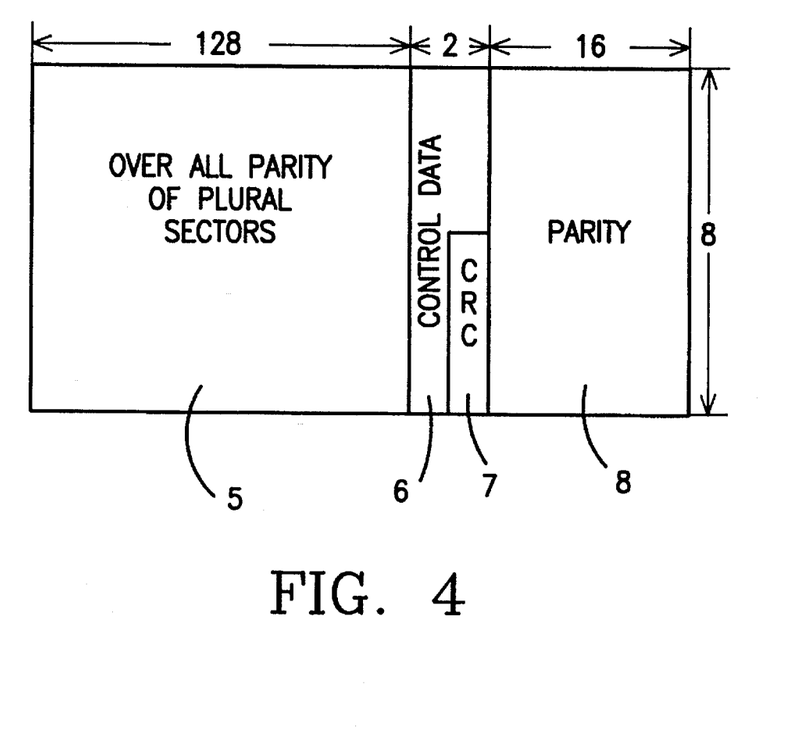
FIG. 4 is a block diagram showing the configuration of parity sectors of the optical disk of the first embodiment.

FIG. 4 is a block diagram showing the configuration of a parity sector.

As shown in FIG. 4, a parity sector has the same configuration as that of a data sector and consists of 8 bytes×146 bytes=1168 bytes. In FIG. 4, 5 designates overall parity of 1024 bytes obtained by performing exclusive OR on each byte of user data in a plurality of sectors. 6 designates control data consisting of the sector address for recording on the disk and the like. 7 designates a cyclic redundancy check code for detecting errors in the overall parity 5 and the control data 6. 8 designates parity which is configured as an error correction code for correcting errors in the overall parity 5, the control data 6 and the CRC 7. As the error detection and correction code, the same one as that in the data sectors in FIG. 3 is used to allow errors in up to 8 bytes to be corrected per row.

Thus, the data sectors and the parity sectors have the same configuration and each sector is configured as an error correction code to allow data reproduction on a sector basis.

As described above, in the optical disk of the first embodiment of the present invention, a plurality of sectors which have been internally configured as error correcting codes are arranged in the form of a matrix which is coded in the directions of the rows and columns into product codes which are prerecorded.

Figure 5:
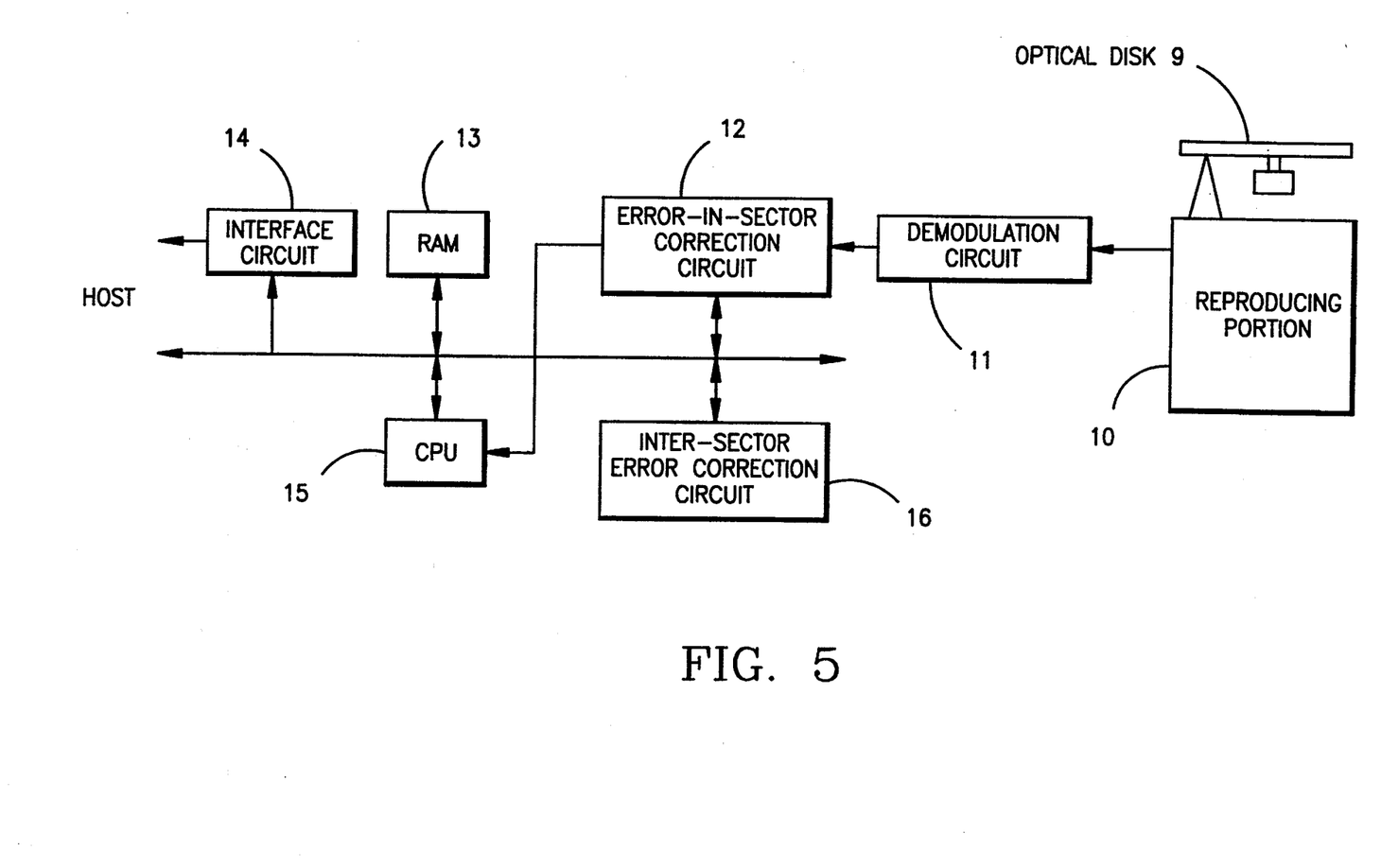
FIG. 5 is a block diagram showing the configuration of an optical disk reproducing apparatus of a second embodiment of the present invention.

FIG. 5 is a block diagram showing the configuration of an optical disk reproducing apparatus of a second embodiment of the present invention for apparatus of a second embodiment of the present invention for reproducing data from the optical disk of the above-described first embodiment of the present invention.

In FIG. 5, 9 designates the optical disk; 10 designates a reproducing portion for converging light emitted by a semiconductor laser into a very small spot on the order of 1 um and for causing the spot to follow tracks on the optical disk 1, thereby reproducing data by means of the light reflected by a recording surface; 11 designates a demodulation circuit for demodulating data which have been modulate-recorded; 12 designates an error-in-sector correction circuit for performing an error correction operation for each sector coded by the Reed-Solomon code or the like to correct errors caused by defects on the disk and the like; 13 designates a RAM used as a data buffer; 14 designates an interface circuit for controlling interface with a host computer; 15 designates a CPU for controlling the optical disk reproducing apparatus as a whole; and 16 designates an inter-sector error correction circuit for decoding error correction codes between sectors which have been configured as a product code between a plurality of sectors. The operation of the present embodiment having such a configuration will now be described.

The optical disk 1 is the optical disk described in the first embodiment which has a sector structure wherein it is divided into tracks and sectors. Each sector is formed with microscopic concave and convex pits on the order of 1 um for prerecording data. The reproducing portion 10 pinpoints the pits with the light emitted by a semiconductor laser to obtain reproduction signals from changes in the amount of the light reflected therefrom and converts the signals into binary values which are transmitted to the demodulation circuit as reproduction data. The demodulation circuit 11 performs modulation using (2, 7) RLLC or the like to digital-demodulate the reproduction data which are in a form suitable for recording and transmits the demodulated data to the error-in-sector correction circuit 12. The error-in-sector correction circuit 12 corrects errors in each sector by decoding the Reed-Solomon codes or the like. At this time, if error correction can not be performed, it informs the CPU 15 of such. The data in each sector which have been corrected are stored in the RAM 13 and are transmitted through the interface circuit 14 to the host computer to complete the data reproduction. The foregoing reproduction operation is controlled by the CPU 15 as a whole.

Whether there is any sector which can not be corrected or not, reproduction is performed not only for the data sectors D1 through D255 but also for the parity sectors P1 through P15 and Q1 through Q16 simultaneously which are stored in the RAM 13 after the errors in sectors are corrected by the error-in-sector correction circuit 12.

An example will now be described for the case wherein sectors which can not be corrected are encountered during the reproduction operation as described above.

Figure 6:
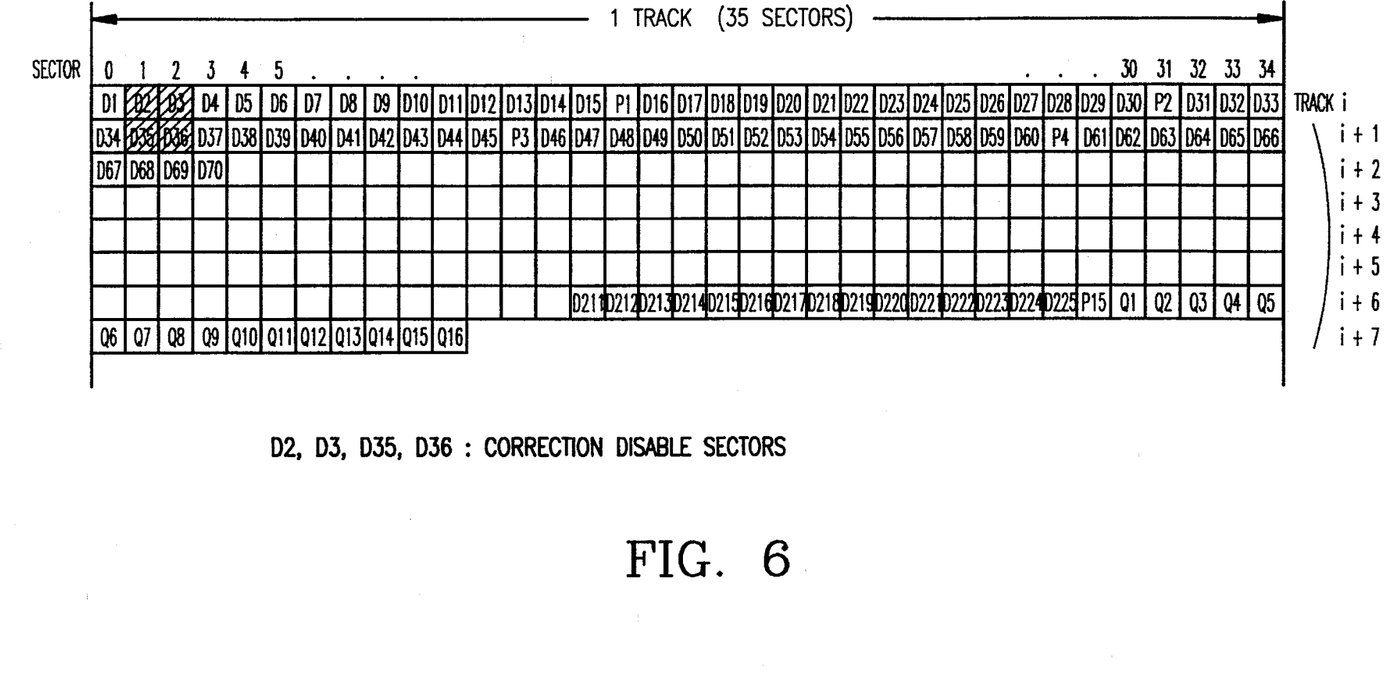
FIG. 6 shows an area of an optical disk to illustrate the actual arrangement of sectors thereon for explaining the operation performed when sectors in which errors can not be corrected are generated in the second embodiment.

FIG. 6 shows an area of the optical disk to show the state of actual recording thereon. Suppose that burst errors are generated by dust or the like and, as a result, error correction is disabled in all of the shaded data sectors D2, D3, D35 and D36 which adjoin each other on the optical disk in FIG. 6. It is likely that burst errors caused by dust or the like are consecutive in the direction of the tracks or in the radial direction of the disk. In this case, the optical disk reproducing apparatus for reproducing data from this optical disk reproduces all the sectors of the block to which the sectors which can not be corrected belong, i.e., D1 through D225, P1 through P15 and Q1 through Q16. The sectors thus reproduced are stored in the RAM 13 in the form of a matrix on a basis of a predetermined information, for example, 15 data sectors and 1 sector in a row direction and the same in a column direction.

Figure 7:
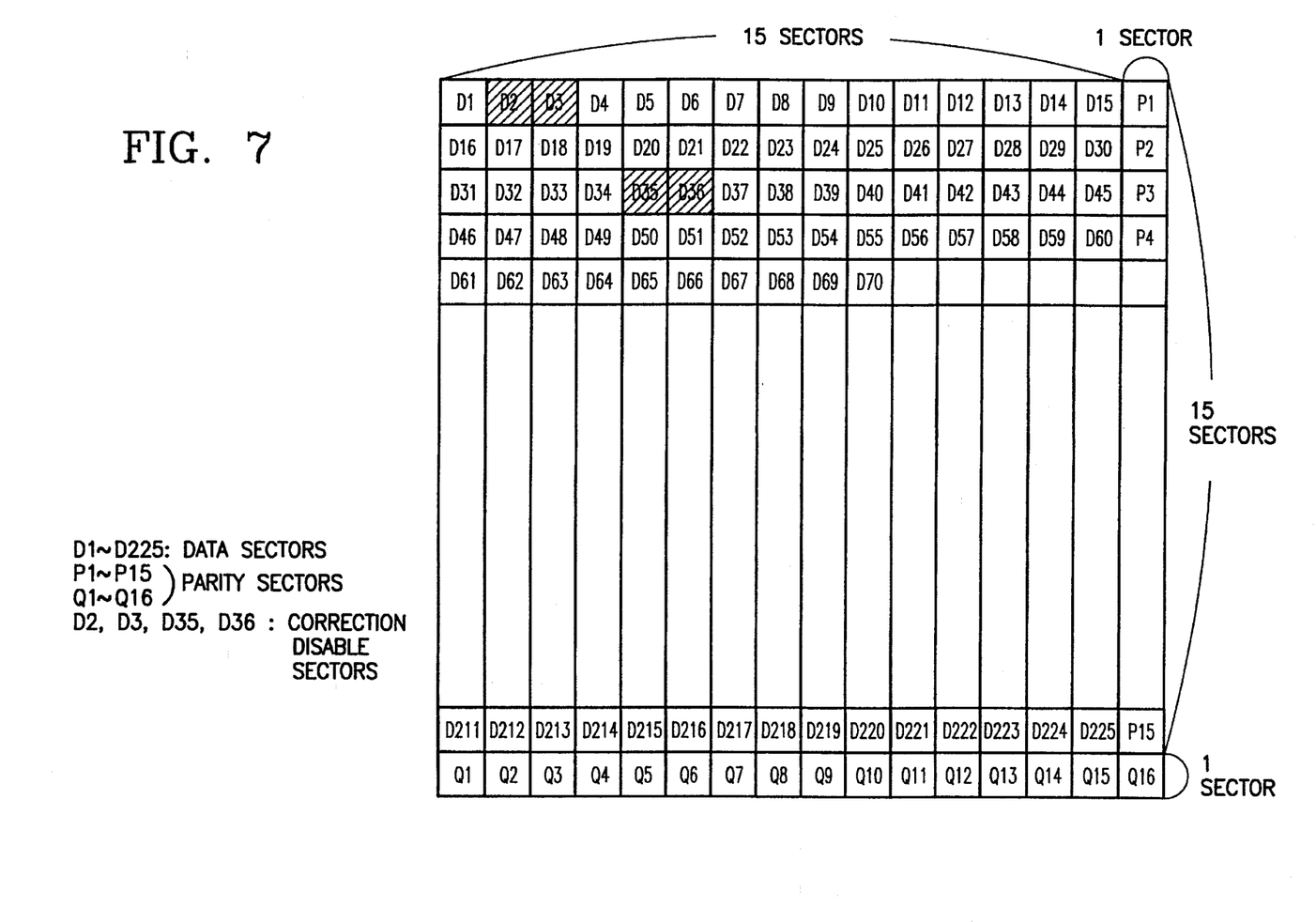
FIG. 7 shows the configuration of codes between sectors for explaining the operation performed when sectors in which an error can not be corrected are generated in the second embodiment.

FIG. 7 shows the state wherein the sectors are stored in the RAM 13. The sectors D2, D3, D35 and D36 which can not be corrected are indicated by the shaded areas in FIG. 7.

The CPU 15 which has been informed by the error-in-sector correction circuit 12 of those sectors which can not be corrected activates the inter-sector error correction circuit 16 when the storing of the entire block including parity sectors into the RAM 13 is complete. At the same time, the CPU 15 provides the inter-sector error correction circuit 16 with the memory locations on the RAM for the sectors which can not be corrected. The inter-sector error correction circuit 16 corrects the multiplied codes on the basis of the memory locations for the sectors which have not been correctable thus provided. When the sectors which can not be corrected as shown in FIG. 7 are generated, the inter-sector error correction circuit 16 corrects the sectors which have not been correctable using the codes in the direction of the column. Specifically, to correct the sector D2, overall parity is obtained for all the sectors D17, D32, D47, D62, . . . , D212 and Q2 other than the sector D2 of the column to which the sector D2 belongs. The overall parity is the user data of the sector D2 itself, and the correction of the sector D2 is thus completed. Similarly, corrections of the sectors which have not been correctable are completed by obtaining the overall parity for the sectors D18, D33, D48, D63 . . . , D213 and Q3 for the sector D3, the overall parity for the sectors D5, D20, D50, D65, . . . , D215 and Q5 for the sector D35, and the overall parity for the sectors D6, D21, D51, D66, . . . , D216 and Q6 for the sector D36. After all the sectors which have not been correctable of one block are corrected by the inter-sector error correction circuit 16, the data in those sectors are transmitted through the interface circuit 14 to the host computer to complete the data reproduction.

By reproducing the parity sectors P1 through P15 and Q1 through Q16 at the same time when the data sectors D1 through D225 are reproduced in the course of the above-described error correction for the product codes between the sectors regardless of whether sectors which can not be corrected are generated or not during a normal reproduction operation, the inter-sector error correction can be immediately started when errors which can not be corrected are generated.

When error correction is simultaneously disabled in sectors which are consecutive in the circumferential and radial directions of a disk as in the above example, with conventional inter-sector coding wherein, for example, one overall parity is added to one track, error correction is not possible because a plurality of errors are generated where there is only one code. In contrast to this, the optical disk and the optical disk reproducing apparatus according to the present invention allow errors in a plurality of sectors to be corrected since product coding is employed for inter-sector coding.

Further, with the optical disk reproducing apparatus of the embodiment of the present invention, all the sectors, i.e., all the parity sectors and data sectors of one block are reproduced in advance and are stored in the RAM regardless of whether error correction in those sectors is disabled or not. As a result, even if errors which can not be corrected occur in the middle of a block, it is not necessary to restart data reproduction by moving an optical head to the beginning of the block to reproduce the parity sector required for inter-sector error correction. Thus, inter-sector error correction can be performed at a high speed.

Meanwhile it is preferable that the number of sectors in the direction of the rows, the number of sectors in the direction of the columns and the number of the sectors recorded on one track are indicated by m, n, and k, respectively, wherein m and n are smaller than k.

Having described preferred embodiments of the present invention with reference to the accompanying drawings, it is to be understood that the present invention is not limited to those precise embodiments, and that various changes and modifications may be effected therein by those skilled in the art without departing from the scope or spirit of the present invention as defined in the appended claims.

What is claimed is:

1. An optical disk, comprising:

data sectors containing data, each data sector being error correction coded;

first parity sectors containing first error correction coding information; and second parity sectors containing second error correction coding information, wherein for the optical disk, if the data sectors, the first parity sectors, and the second parity sectors are arranged in a matrix having rows and columns where data sectors and a first parity sector are elements of each of a plurality of rows, and data sectors and a second parity sector are elements of each of a plurality of columns, in each of the plurality of rows, the first error correction coding contained in the first parity sector of each of the plurality of rows would correspond to the data contained in the data sectors of that row, and in each of the plurality of columns, the second error correction coding contained in the second parity sector of each of the plurality of columns would correspond to the data contained in the data sectors of that column.

2. The optical disk according to claim 1, wherein the data sectors and the parity sectors are located on the optical disk in an order that corresponds to the order of the data sectors and the parity sectors in the rows of the matrix, such that the sectors in a same column of the matrix are not aligned in a radial direction of the optical disk.

3. An optical disk reproducing apparatus for reproducing data from the optical disk according to claim 2 comprising:

a first error correcting means for performing error correction on a sector basis and a second error correcting means for performing error correction based upon at least one of the first error correction coding information and the second error correction coding information, the second error correcting means performing error correction only for a row or column having a sector which cannot be corrected by the first error correcting means.

4. The optical disk according to claim 1, wherein when a number of rows of the matrix is m, a number of columns of the matrix is n, and a number of sectors recorded on one track of the optical disk is k, m and n are smaller than k.

5. An optical disk reproducing apparatus for reproducing data from the optical disk according to claim 4 comprising:

a first error correcting means for performing error correction on a sector basis and a second error correcting means for performing error correction based upon at least one of the first error correction coding information and the second error correction coding information, the second error correcting means performing error correction only for a row or column having a sector which cannot be corrected by the first error correcting means.

6. The optical disk according to claim 1, wherein when a number of rows of the matrix is m, and a number of the sectors recorded on one track of the optical disk is k, m and k are prime to each other.

7. An optical disk reproducing apparatus for reproducing data from the optical disk according to claim 6 comprising:

a first error correcting means for performing error correction on a sector basis and a second error correcting means for performing error correction based upon at least one of the first error correction coding information and the second error correction coding information, the second error correcting means performing error correction only for a row or column having a sector which cannot be corrected by the first error correcting means.

8. An optical disk reproducing apparatus for reproducing data from the optical disk according to claim 1, comprising:

a first error correcting means for performing error correction on a sector basis; and a second error correcting means for performing error correction based upon at least one of the first error correction coding information and the second error correction coding information, the second error correcting means performing error correction only for a row or column having a sector which cannot be corrected by the first error correcting means.

9. The optical disk reproducing apparatus according to claim 8 further including:

a RAM capable of storing all of the data and information recorded in each sector of the matrix wherein all the sectors in the matrix are reproduced in advance and are stored in said RAM regardless of whether the matrix includes sectors which can not be corrected by the first correcting means.

10. An optical disk, comprising:

data sectors containing data;

first parity sectors containing first error correction coding information; and second parity sectors containing second error correction coding information, wherein for the optical disk, if the data sectors, the first parity sectors, and the second parity sectors are arranged in a matrix having rows and columns where data sectors and a first parity sector are elements of each of a plurality of rows, and data sectors and a second parity sector are elements of each of a plurality of columns, in each of the plurality of rows, the first error correction coding contained in the first parity sector of each of the plurality of rows would correspond to the data contained in the data sectors of that row, and in each of the plurality of columns, the second error correction coding contained in the second parity sector of each of the plurality of columns would correspond to the data contained in the data sectors of that column, the data sectors and the parity sectors being located on the optical disk in an order that corresponds to the order of the data sectors and the parity sectors in the rows of the matrix, such that the sectors in a same column of the matrix are not aligned in a radial direction of the optical disk.

11. An optical disk reproducing apparatus for reproducing data from the optical disk according to claim 10, comprising:
   a first error correcting means for performing error correction on a sector basis; and
   a second error correcting means for performing error correction based upon at least one of the first error correction coding information and the second error correction coding information,
   the second error correcting means performing error correction only for a row or column having a sector which cannot be corrected by the first error correcting means.

12. The optical disk reproducing apparatus according to claim 11, further including:
   a RAM capable of storing all of the data and information recorded in each sector of the matrix wherein all the sectors in the matrix are reproduced in advance and are stored in said RAM regardless of whether the matrix includes sectors which can not be corrected by the first correcting means.

13. The optical disk according to claim 10, wherein
   when a number of rows of the matrix is m, a number of columns of the matrix is n, and a number of sectors recorded on one track of the optical disk is k, m and n are smaller than k.

14. An optical disk reproducing apparatus for reproducing data from the optical disk according to claim 13, comprising:
   a first error correcting means for performing error correction on a sector basis; and
   a second error correcting means for performing error correction based upon at least one of the first error correction coding information and the second error correction coding information,
   the second error correcting means performing error correction only for a row or column having a sector which cannot be corrected by the first error correcting means.

15. The optical disk reproducing apparatus according to claim 14 further including:
   a RAM capable of storing all of the data and information recorded in each sector of the matrix wherein all the sectors in the matrix are reproduced in advance and are stored in said RAM regardless of whether the matrix includes sectors which can not be corrected by the first correcting means.

16. The optical disk according to claim 10, wherein
   when a number of rows of the matrix is m, and a number of the sectors recorded on one track of the optical disk is k, m and k are prime to each other.

17. An optical disk reproducing apparatus for reproducing data from the optical disk according to claim 16, comprising:
   a first error correcting means for performing error correction on a sector basis; and
   a second error correcting means for performing error correction based upon at least one of the first error correction coding information and the second error correction coding information,
   the second error correcting means performing error correction only for a row or column having a sector which cannot be corrected by the first error correcting means.

18. The optical disk reproducing apparatus according to claim 17 further including:
   a RAM capable of storing all of the data and information recorded in each sector of the matrix wherein all the sectors in the matrix are reproduced in advance and are stored in said RAM regardless of whether the matrix includes sectors which can not be corrected by the first correcting means.

19. An optical disk, comprising:
   data sectors containing data;
   first parity sectors containing first error correction coding information; and
   second parity sectors containing second error correction coding information, wherein for the disk,
   if the data sectors, the first parity sectors, and the second parity sectors are arranged in a matrix having rows and columns where data sectors and a first parity sector are elements of each of a plurality of rows, and data sectors and a second parity sector are elements of each of a plurality of columns, such that when a number of rows of the matrix is m, a number of columns of the matrix is n, and a number of sectors recorded on one track of the optical disk is k, m and n are smaller than k,
   in each of the plurality of rows, the first error correction coding contained in the first parity sector of each of the plurality of rows would correspond to the data contained in the data sectors of that row, and
   in each of the plurality of columns, the second error correction coding contained in the second parity sector of each of the plurality of columns would correspond to the data contained in the data sectors of that column.

20. The optical disk according to claim 19, wherein m and k are prime to each other.

21. An optical disk reproducing apparatus for reproducing data from the optical disk according to claim 20, comprising:
   a first error correcting means for performing error correction on a sector basis; and
   a second error correcting means for performing error correction based upon at least one of the first error correction coding information and the second error correction coding information,
   the second error correcting means performing error correction only for a row or column having a sector which cannot be corrected by the first error correcting means.

22. The optical disk reproducing apparatus according to claim 21 further including:
   a RAM capable of storing all of the data and information recorded in each sector of the matrix wherein all the sectors in the matrix are reproduced in advance and are stored in said RAM regardless of whether the matrix includes sectors which can not be corrected by the first correcting means.

23. An optical disk, comprising:
   data sectors containing data;
   first parity sectors containing first error correction coding information; and
   second parity sectors containing second error correction coding information, wherein for the disk,
   if the data sectors, the first parity sectors, and the second parity sectors are arranged in a matrix having rows and columns where data sectors and a first parity sector are elements of each of a plurality of rows, and data sectors and a second parity sector are elements of each of a plurality of columns, such that, when a number of rows of the matrix is m, and a number of the sectors recorded on one track of the optical disk is k, m and k are prime to each other,
   in each of the plurality of rows, the first error correction coding contained in the first parity sector of each of the plurality of rows would correspond to the data contained in the data sectors of that row, and in each of the plurality of columns, the second error correction coding contained in the second parity sector of each of the plurality of columns would correspond to the data contained in the-data sectors of that column.

24. An optical disk reproducing apparatus for reproducing data from the optical disk according to claim 23, comprising:

a first error correcting means for performing error correction on a sector basis; and a second error correcting means for performing error correction based upon at least one of the first error correction coding information and the second error correction coding information, the second error correcting means performing error correction only for a row or column having a sector which cannot be corrected by the first error correcting means.

25. The optical disk reproducing apparatus according to claim 24 further including:

a RAM capable of storing all of the data and information recorded in each sector of the matrix wherein all the sectors in the matrix are reproduced in advance and are stored in said RAM regardless of whether the matrix includes sectors which can not be corrected by the first correcting means.

* * * * *